A. N. SORENSON.
BENCH SCREW.
APPLICATION FILED JULY 11, 1911.

1,020,322.

Patented Mar. 12, 1912.

WITNESSES:
Charles H. Wagner.
H. M. Brooks.

INVENTOR
Anchor N. Sorenson
BY Robb Robb
Attorneys

UNITED STATES PATENT OFFICE.

ANCHOR N. SORENSON, OF GUSTAVE, SOUTH DAKOTA.

BENCH-SCREW.

1,020,322.  Specification of Letters Patent.  Patented Mar. 12, 1912.

Application filed July 11, 1911. Serial No. 637,875.

*To all whom it may concern:*

Be it known that I, ANCHOR N. SORENSON, a citizen of the United States, residing at Gustave, in the county of Harding and State of South Dakota, have invented certain new and useful Improvements in Bench-Screws, of which the following is a specification.

This invention relates to bench screws, and primarily to the type of quick action adjustable screws.

The invention resides in constructing a block provided with threads adapted to engage the threads of the screw, which block may be disengaged from said screw, as will be more fully described hereinafter.

A further object of the present invention is to provide a positive locking means for the lock or half nut which is provided with threads whereby said half nut is securely interlocked with the threads of the screw and cannot accidentally be disengaged therefrom, thus making the present invention of a more desirable nature than the quick action adjustable screws found on the market, as the disadvantages found in the latter are entirely wanting in the present invention.

For a full understanding of the present invention, reference is to be had to the following description and to the accompanying drawings, in which—

Figure 1:
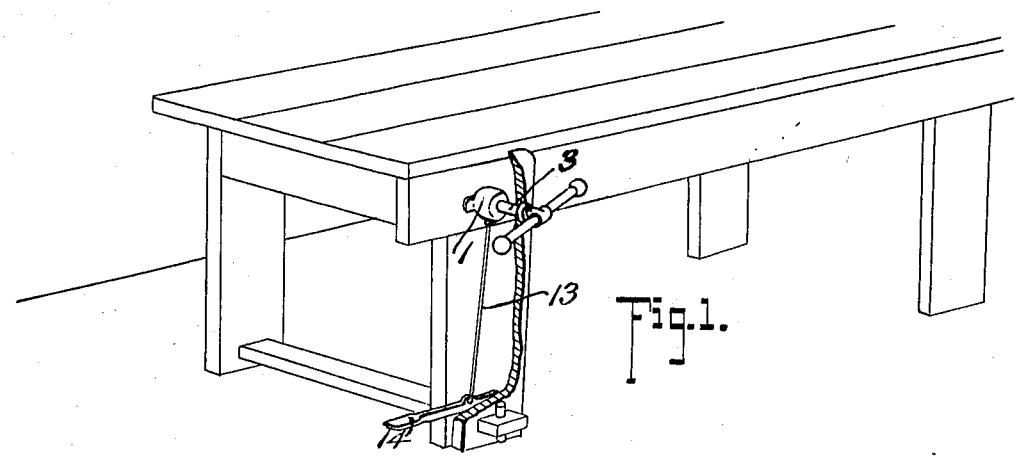
Figure 2:
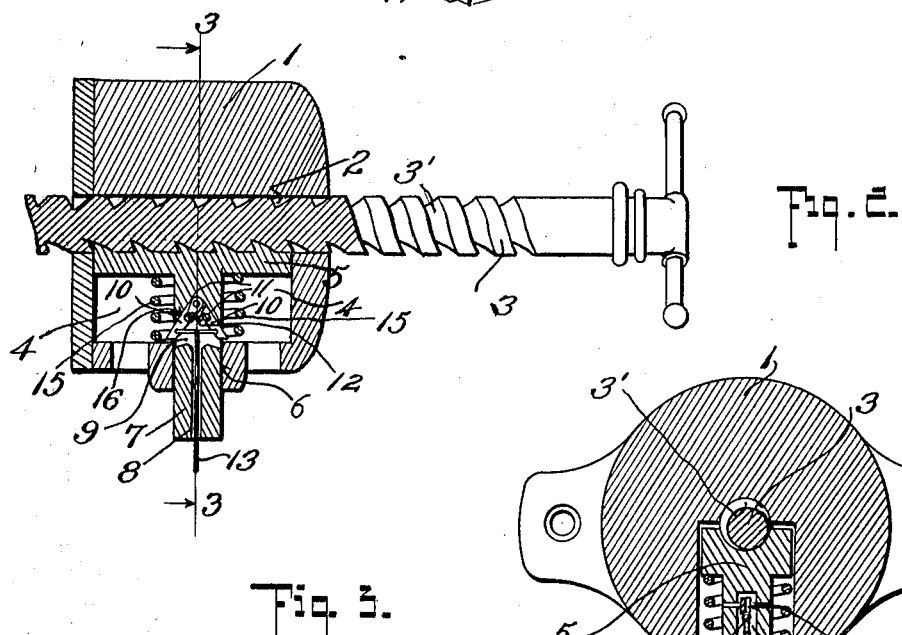
Figure 3:
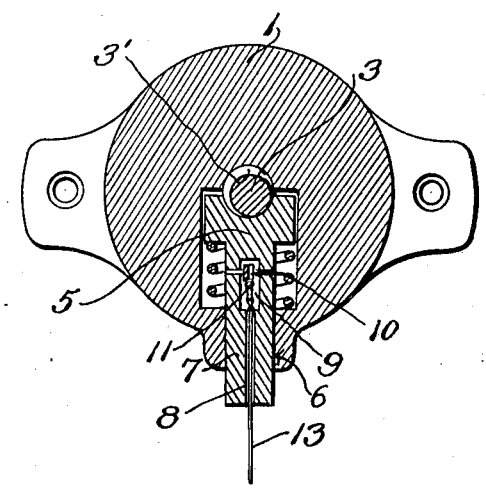

Figure 1 is a view illustrating the present invention applied to a work bench; Fig. 2 is a vertical longitudinal section disclosing the present invention more clearly; and Fig. 3 is a transverse section taken on the line 3—3 of Fig. 2.

Throughout the following detail description and on the several figures of the drawings, similar parts are referred to by like reference characters.

The invention which may be applied to any device where quick adjustment is desired but, as illustrated in the drawings, is secured to a work bench consists of the member 1 which may be carried by the bench in any suitable manner, said member or block 1 having a central bore 2 therethrough which is adapted to receive the screw 3 which is provided with screw threads having one of their sides beveled.

The lower portion of the block or member 1 is recessed, as at 4, which recess opens into the bore 2 and receives the plunger or pawl 5 which is in the shape of a half nut and provided with threads having one of their sides beveled, the same being adapted to engage the threads 3'.

An opening 6 is provided in the block 1 which is adapted to slidably receive a shank or rod 7 carried by the pawl or dog 5, said shank portion being provided with a bore 8, the upper end of said bore opening into the transverse slot 9. Pivotally mounted in this transverse slot 9 is a pair of spring actuated arms or catches 10 which are provided on their adjacent edges with seats 11 adapted to receive coiled or otherwise formed spring 12 for projecting said arms outwardly to engage the portion of the block about the bore 6. A flexible member 13 is connected to each of the catches 10 and passes through the bore 8 and is connected to any suitable operating means such as a foot lever 14 mounted on the bench within easy reach of the operator's foot. A coiled spring 15 encircles the shank 7 and has one terminal thereof bearing on the block 1, while the other terminal exerts an upward push on the pawl 5 whereby the latter is normally retained in engagement with the screw 3.

When the pawl 5 is in its normal position, the spring actuated catches 10 engage the block 1, whereby the pawl is positively locked from accidental disengagement with the screw 3. It will be observed that upon exerting a downward pull upon the flexible member 13, the catches 10 will be withdrawn until their inward movement is limited by contact with the shank 7 and, upon further pulling of said flexible member, the pawl 5 will be disengaged. The downward movement of the pawl 5, when the latter is in its normal position, will be prevented by the catches 10 contacting with or abutting againt the bearing portion 16 and formed on the shank 7.

One side of each of the screw threads 3' and those carried by the pawl 5 is beveled and the threads interlocked so that when it is desired to clamp any article, the block 1 may be shifted against the article without rotating the screw, the catches being withdrawn to an inoperative position whereby a yielding movement may be given said pawl.

Having thus fully described my invention, what is claimed as new is:—

1. A bench screw comprising a block provided with an opening therethrough, a threaded member passing through said opening, a pawl yieldably mounted on said block and adapted to engage said threaded member, and means carried by said pawl and adapted to engage said block for positively locking the former in engagement with said threaded member.

2. In a bench screw, in combination, a block provided with an opening therethrough, a threaded member passing through said opening, a pawl yieldably mounted within said block for engaging said threaded member, and a latch carried by said pawl and adapted to engage said block for retaining the former in positive engagement with the threaded member.

3. In a bench screw, a block provided with an opening therein and a recess communicating with said opening, a pawl yieldably mounted within said recess, a plurality of latches pivotally carried by said pawl adapted to engage said block for retaining the former in positive locking relation with the screw member, and means for disengaging said latches from said block.

4. In a bench screw, a block provided with a central opening therein and a recess communicating with said opening, a threaded member passing through said opening, a pawl yieldably mounted within said recess and normally engaging said threaded member, a depending shank formed on said pawl and provided with a central bore opening into a transverse slot, means mounted within said slot for engaging said block whereby said pawl is positively locked from disengagement with said threaded member, and means passing through said central bore for disengaging the first named means from said block whereby the pawl may be disengaged from the threaded member.

5. In a bench screw, a block provided with a central opening therein and a recess communicating with said opening, a threaded member passing through said opening, a pawl yieldably mounted within said recess and normally engaging said threaded member, a depending shank formed on said pawl and provided with a central bore opening into a transverse slot, a plurality of spring actuated latches mounted within said transverse slot and adapted to engage said block, and a flexible member passing through said bore for withdrawing said latches from engagement with the block and the pawl from engagement with said threaded member.

6. A bench screw comprising a block provided with an opening therethrough, a threaded member passing through said opening, a pawl yieldably mounted on said block and adapted to engage said threaded member, and means yieldably carried by said pawl and adapted to engage said block for positively locking the former in engagement with said threaded member.

In testimony whereof I affix my signature in presence of two witnesses.

ANCHOR N. SORENSON.

Witnesses:
ALFRED SORENSON,
AUGUST OLSON.

---

Copies of this patent may be obtained for five cents each, by addressing the "Commissioner of Patents, Washington, D. C."